US008898408B2

(12) United States Patent
Berke et al.

(10) Patent No.: US 8,898,408 B2
(45) Date of Patent: Nov. 25, 2014

(54) MEMORY CONTROLLER-INDEPENDENT MEMORY MIRRORING

(75) Inventors: Stuart Allen Berke, Austin, TX (US); William Sauber, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 62 days.

(21) Appl. No.: 13/323,428

(22) Filed: Dec. 12, 2011

(65) Prior Publication Data
US 2013/0151767 A1 Jun. 13, 2013

(51) Int. Cl.
G06F 13/00 (2006.01)

(52) U.S. Cl.
USPC .......................................................... 711/162

(58) Field of Classification Search
CPC combination set(s) only.
See application file for complete search history.

(56) References Cited

U.S. PATENT DOCUMENTS

| | | | |
|---|---|---|---|
| 6,038,680 A | 3/2000 | Olarig | |
| 6,223,301 B1 | 4/2001 | Santeler et al. | |
| 6,785,835 B2 | 8/2004 | MacLaren et al. | |
| 7,404,057 B2 | 7/2008 | Radhakrishnan et al. | |
| 7,694,093 B2 | 4/2010 | Shaw et al. | |
| 2002/0174294 A1* | 11/2002 | Tamura | 711/113 |
| 2004/0090827 A1* | 5/2004 | Dahlen et al. | 365/200 |
| 2005/0071527 A1* | 3/2005 | Cordina et al. | 710/52 |
| 2006/0077750 A1 | 4/2006 | Pescatore | |
| 2007/0226422 A1* | 9/2007 | Mino et al. | 711/137 |
| 2008/0140949 A1* | 6/2008 | Hartwich et al. | 711/154 |
| 2008/0183964 A1* | 7/2008 | Inoue et al. | 711/114 |
| 2008/0270717 A1* | 10/2008 | Shaw et al. | 711/162 |
| 2009/0106491 A1* | 4/2009 | Piszczek et al. | 711/114 |
| 2009/0187806 A1* | 7/2009 | Pescatore | 714/757 |
| 2010/0036850 A1* | 2/2010 | Garman et al. | 707/10 |
| 2011/0154103 A1* | 6/2011 | Bulusu et al. | 714/6.23 |
| 2011/0225589 A1* | 9/2011 | Pirog et al. | 718/102 |
| 2012/0042142 A1* | 2/2012 | Garman et al. | 711/162 |
| 2013/0061087 A1* | 3/2013 | Kopylovitz | 714/6.3 |
| 2013/0067179 A1* | 3/2013 | Paleologu et al. | 711/159 |

* cited by examiner

*Primary Examiner* — Charles Rones
*Assistant Examiner* — Han Doan
(74) *Attorney, Agent, or Firm* — Haynes and Boone, LLP

(57) ABSTRACT

A method of memory controller-independent memory mirroring includes providing a mirroring association between a first memory segment and a second memory segment that is independent of a memory controller. A memory buffer receives data from the memory controller that is directed to a first memory location in the first memory segment. The memory buffer writes the data, independent of the memory controller, to both the first memory segment and the second memory segment according to the mirroring association. The memory buffer receives a plurality of read commands from the memory controller that are directed to the first memory location in the first memory segment and, in response, reads data from an alternating one of the first memory segment and the second memory segment and stores both first data from the first memory segment and second data from the second memory segment.

17 Claims, 7 Drawing Sheets

MEMORY CONTROLLER-INDEPENDENT MEMORY MIRRORING

BACKGROUND

The present disclosure relates generally to information handling systems (IHSs), and more particularly to memory controller-independent memory mirroring in an IHS.

As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Currently, it is common for an IHS that handles critical data to maintain a mirrored copy of data in the system memory. For instance, when memory mirroring is enabled in an IHS, a memory controller may write a piece of data to two ranks instead of just one, where one rank is a primary rank and the other is a secondary or 'mirror' rank. As such, if the data in the primary rank becomes corrupted, the memory controller may retrieve the data from the 'mirror' rank instead of the primary rank. However, the cost of memory mirroring is relatively high because, when enabled, it is typically enabled across all memory locations within the system memory, thereby reducing system memory capacity by half. Further, memory mirroring is traditionally controlled by memory controllers, which create mirroring associations based only on the ranks of memory visible to them. In some IHSs, however, physical ranks on buffered DIMMs and risers (e.g. Load-Reduced Dual In-line Memory Modules (LRDIMMs) and 3D Through-Silicon Via (TSV) DIMMs) may be hidden from the memory controllers, and thus excluded from memory controller-configured memory mirroring. Accordingly, although memory mirroring in IHSs has been generally satisfactory, it has not been satisfactory in all respects.

SUMMARY

According to one embodiment, a method of memory controller-independent memory mirroring in an information handling system (IHS) includes providing a mirroring association between a first memory segment and a second memory segment that are located in a system memory and that are coupled to a memory buffer, wherein the mirroring association is independent of a memory controller that is associated with the system memory, receiving, by the memory buffer from the memory controller, data that is directed to a first memory location in the first memory segment, writing, independent of the memory controller with the memory buffer, the data to both the first memory segment and the second memory segment according to the mirroring association, and receiving, by the memory buffer from the memory controller, a plurality of read commands directed to the first memory location in the first memory segment, and, in response: reading data from an alternating one of the first memory segment and the second memory segment, and storing the read data in the memory buffer such that the memory buffer includes both first data from the first memory location in the first memory segment and second data from a second memory location in the second memory segment.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various components may be arbitrarily drawn in different scales for the sake of simplicity and clarity.

In addition, for purposes of this disclosure, an information handing system (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, a mobile communication device, or any other suitable device. The IHS may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
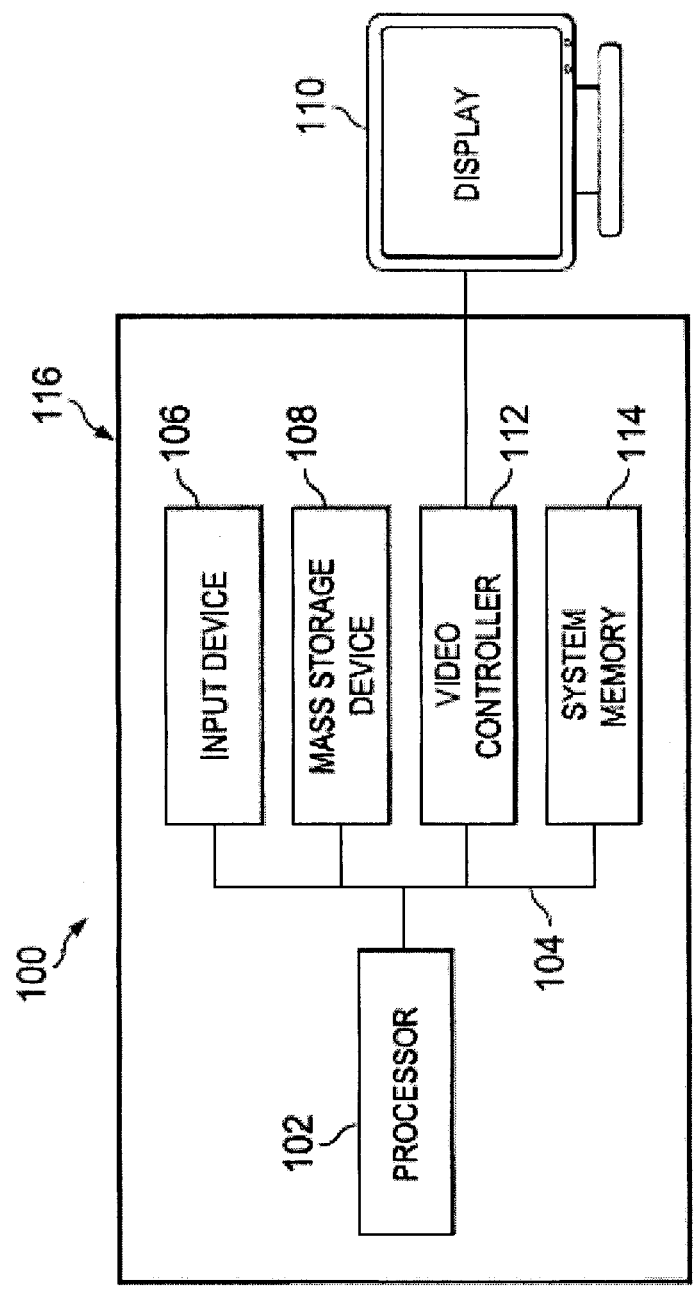
FIG. 1 is a simplified block diagram of an example information handling system HS).

In one embodiment, an IHS 100 shown in FIG. 1 includes a processor 102, which is connected to a bus 104. Bus 104 serves as a connection between processor 102 and other components of IHS 100. An input device 106 is coupled to processor 102 to provide input to processor 102. Examples of input devices may include keyboards, touch-screens, pointing devices such as mice, trackballs, and track-pads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
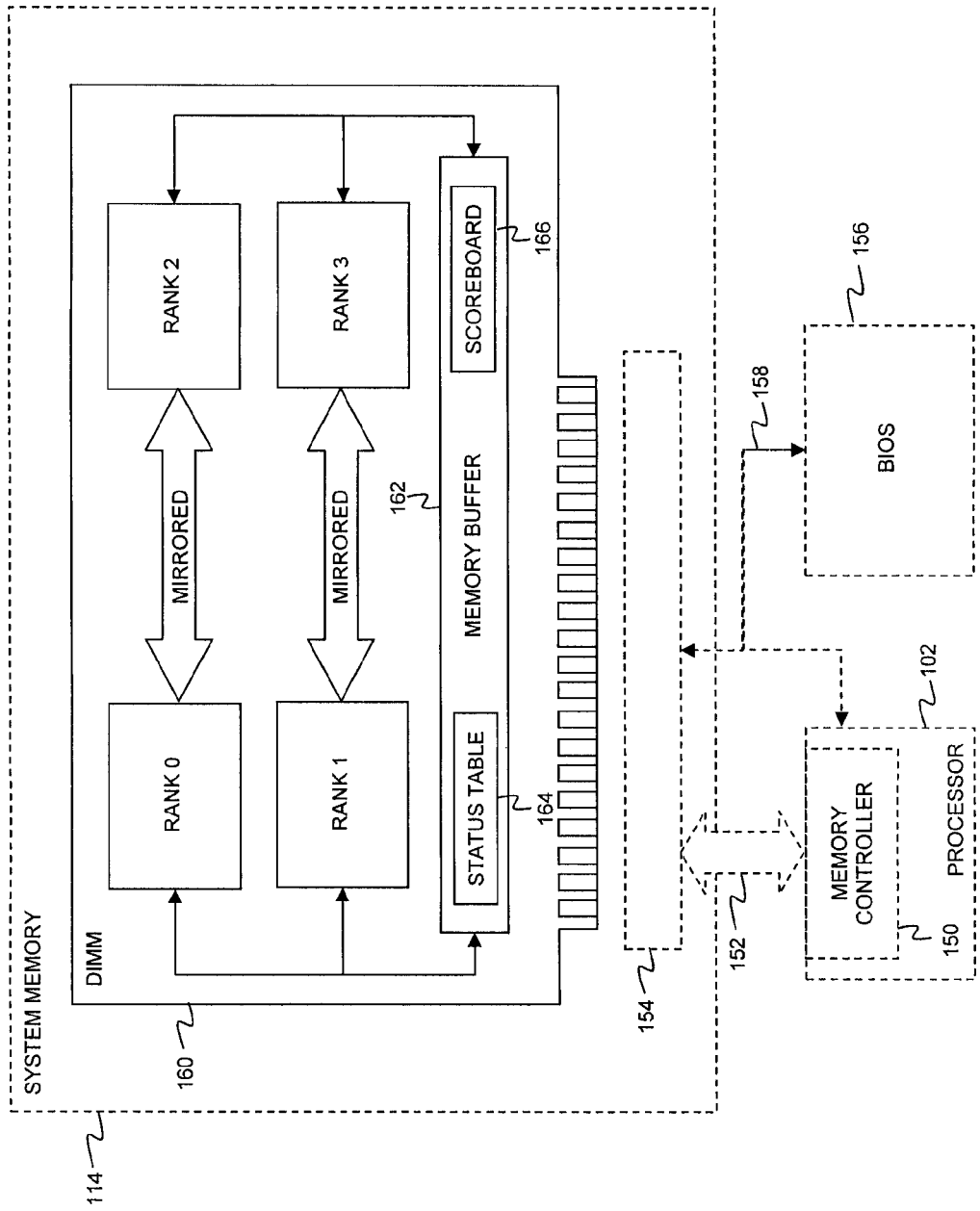
FIG. 2 is a functional block diagram of a portion of the IHS of FIG. 1 including the processor and system memory according to aspects of the present disclosure.

FIG. 2 is a functional block diagram of a portion of the IHS 100 of FIG. 1 including the processor 102 and system memory 114 according to aspects of the present disclosure. In general, the IHS 100 is configured to selectively mirror portions of the system memory 114 in a manner independent of a memory controller associated with the system memory. For example, portions or segments of the system memory 114 may be mirrored by rank, bank, DRAM chip, address range, or by another grouping, and data access between the mirrored portions may be managed by one or more memory buffers in the system memory independent of and/or without influence from the memory controller. In the illustrated embodiment, the processor 102 includes an integrated memory controller 150 that manages the flow of data to and from the system memory 114. In alternate embodiments, however, the memory controller 150 may be separate from the processor 102. The system memory 114 is generally communicatively coupled to the processor (and memory controller 150) via a channel 152. The channel 152 transmits data and command signals between the memory controller 150 and the system memory 114. The channel may support one, two, three, or more DIMM sockets per channel depending on the type of system memory. Further, although a single channel is shown, additional channels may be communicatively coupled to the memory controller 150.

Generally, one or more sockets accepting memory modules may communicate with the memory controller 150 via the channel 152. A Dual In-line Memory Module (DIMM) socket 154 is communicatively coupled to the memory controller 150 via the channel 152. In the illustrated embodiment, the DIMM socket 154 conforms to a DIMM standard promulgated by the Joint Electron Devices Engineering Council (JEDEC). Alternatively, the sockets 154 may be a single in-line memory module (SIMM) socket, another type of memory module socket, or may conform to a different standard such as the proposed Double Data Rate Four (DDR4), the DDR3 SDRAM standard, a future DDR standard promulgated by JEDEC, or another memory standard or proprietary design.

The IHS 100 further includes a management module 156 communicatively coupled to the processor 102 and the system memory 114 via an I/O channel 158. In the illustrated embodiment, the management module is a basic input/output system (BIOS) module. However, in other embodiments, it may be a baseboard management controller (BMC) or another in-band or out-of-band (OOB) controller. In some embodiments, the I/O channel 158 may be a part of a communication bus such as a system management bus (SMBus) or other system bus. In the illustrated embodiment, the BIOS module 156 is implemented on a non-volatile read-only memory (ROM) chip and includes firmware operable to detect and identify resources within IHS 100, provide the appropriate drivers for those resources, initialize those resources, and access those resources. In the illustrated embodiment, the BIOS module 156 includes memory initialization firmware to initialize system memory 114. As an aspect of this, the BIOS memory initialization firmware initially configures the memory mirroring in system memory 114. In alternative embodiments, however, a BMC, OOB controller, or other type of management module may configure memory mirroring in IHS 100. Memory mirroring configuration will be discussed in more detail below.

As shown in FIG. 2, a DIMM 160 is configured to mate with the DIMM socket 154. In some embodiments the DIMM socket and DIMM may conform to a standard such as the proposed DDR4 DIMM standards, the DDR3 DIMM standards, the DDR2 DIMM standards, or future standards promulgated by JEDEC or another standard setting organization. Further, in the illustrated embodiment, the DIMM 160 is a buffered DIMM such as a load-reduced DIMM (LRDIMM). The DIMM 160 includes memory storage locations that are logically divided into ranks 0, 1, 2, and 3. Memory locations in a single rank are accessed simultaneously by a read or write command from the memory controller 150. In some embodiments, each rank may be comprised of memory locations that span across multiple DRAM chips, but, in others, a single DRAM package may include multiple ranks. For example, multiple die may be included within a single DRAM package to provide a plurality of ranks. Further, although the DIMM 160 is shown as hosting four ranks, in alternative embodiments, it may host a greater or fewer number of ranks depending on the specifications of the DIMM. For example, a DDR4 DIMM may support up to 16 ranks, and a DDR3 DIMM may support up to 8 ranks. As shown in FIG. 2, rank 0 is mirrored by rank 2 and rank 1 is mirrored by rank 3. That is, data stored in the memory locations that comprise rank 0 is also stored in the memory locations of rank 2, and data stored in the memory locations that comprise rank 1 is also stored in the memory locations of rank 3. The DIMM 160 includes an onboard memory buffer 162 that is configured to buffer data transmitted between the DRAM chips on DIMM 160 and the memory controller 150 (i.e. in a Buffer-on-Board configuration). In the illustrated embodiment, the memory buffer is a digital hardware circuit integrated into the DIMM, but, in alternative embodiments, it may be disposed on other hardware components such as a riser or across a plurality of hardware devices. The buffer 162 is configured to manage the memory mirroring for the DIMM 160 at the direction of the BIOS 156. As a result, memory mirroring is independent of, and invisible to, the memory controller 150. For example, if the memory controller 150 sends a read command to the DIMM 160 directed to a memory address in rank 0, the memory buffer may read the requested data from either rank 0 or rank 2, and return it to the memory controller without an indication of the rank from which the data was actually read. Further, any fail-over from one rank to another due to a data error is handled by the memory buffer 162 and is independent of the memory controller 150.

To manage the memory mirroring on DIMM 160, the memory buffer 162 includes a status table 164. The status table tracks the mirroring associations between the ranks on DIMM 160 along with the status of each association. In the illustrated embodiment, the memory initialization firmware in the BIOS 156 may populate the status table during memory initialization. Specifically, the BIOS 156 designates the granularity of the memory mirroring (e.g. by rank, DIMM, DRAM, bank, address range, etc) and designates a set of primary memory segments and a set of corresponding mirrored memory segments according to memory mirroring association configuration information. In the illustrated embodiment of FIG. 2, the granularity of each mirrored segment is a rank, where ranks 0 and 1 have been set as primary ranks and ranks 2 and 3 have been set as respective mirrored ranks. In alternative embodiments, however, memory segments other than ranks may be mirrored against each other. That is, the granularity of the mirroring may be different. Additionally, the memory segments designated by the BIOS as mirrors may be excluded from the available system memory address range passed to the memory controller 150 by the BIOS 156, and thus may be unavailable to the memory controller 150. Depending on the IHS DIMM configuration and the rank designations, the portions of memory designated as mirrored segments may appear as "holes" to the memory controller 150. An example of the status table 164 is shown in Table 1 below:

TABLE 1

| Rank # | Mirrored Rank # | Rank Status | Notes |
| --- | --- | --- | --- |
| 0 | 2 | Valid | Operational, mirrored |
| 1 | 3 | Failed | Memory errors, not used |
| 2 | 0 | Valid | Operational, mirrored |
| 3 | 1 | Valid | Operational, no longer mirrored |

Because the system memory behind memory buffer 162 is mirrored by rank, each row in Table 1 corresponds to a rank controlled by the memory buffer 162. For each rank, the table includes an associated mirrored rank and the rank's current status. Rank status may be set to 'Valid' when the rank is operational, 'Failed' when the rank has produced data errors and is no longer used to store data by the memory buffer, and 'Invalid' when the rank contains uninitialized data, for example, after a reboot. In the example, rank 0 is mirrored by rank 2 and its status is valid. Rank 1, however, is mirrored by rank 3 but its status is 'Failed' because it produced errors in a previous data access. Rank 3 is still operational but is no longer mirrored due to the failed state of rank 1. For the sake of clarity, Table 1 includes a 'Notes' column that explains the state of each listed rank, but the status table 164 would not include such a column when stored in the memory buffer. After the status table 164 is populated by the BIOS 156 during memory initialization, the memory buffer 162 or BIOS 156 updates the status of each rank as memory is accessed and errors occur during IHS runtime.

It is understood that the above Table 1 is simply an example and the status table 164 may contain additional and/or different information and be configured differently in alternative embodiments. In some embodiments, the rows of the status table may correspond to segments of memory different than ranks depending on the granularity of the memory mirroring. For example, memory mirroring may be configured at a sub-rank level by address range. An example of the status table 164 when memory mirroring in DIMM 160 is configured by address range is shown in Table 2 below:

TABLE 2

| Rank # | Rank # Mirrored | Start Address | End Address | Rank Status | Notes |
| --- | --- | --- | --- | --- | --- |
| 0 | 2 | 00000000 | FFFFFFFF | Valid | Operational, mirrored |
| 1 | 3 | 00000000 | 1FFFFFFF | Valid | Operational, mirrored |
| 1 | 3 | 20000000 | FFFFFFFF | Valid | Operational, no longer mirrored |
| 2 | 0 | 00000000 | FFFFFFFF | Valid | Operational, mirrored |
| 3 | 1 | 00000000 | 1FFFFFFF | Valid | Operational, mirrored |
| 3 | 1 | 20000000 | FFFFFFFF | Failed | Memory errors, not used |

As shown in the example Table 2, two distinct address ranges in rank 1 are mirrored against two corresponding address ranges in rank 3. For example, the address range 00000000 to 1FFFFFFF in rank 1 is mirrored against the address range 00000000 to 1FFFFFFF in rank 3. Table 3 also indicates that although the address range 20000000 to FFFFFFFF in rank 1 was initially mirrored against the address range 20000000 to FFFFFFFF in rank 3, the address portions are no longer mirrored because an error was detected in data retrieved from a memory location in the range 20000000 to FFFFFFFF in rank 3. It is understood that Table 2 is just an example and the status table 164 may reflect any number of memory mirroring configurations. Additionally, in some embodiments, the granularity of memory mirroring may be user configurable. In such a scenario, the status table 164 may be configurable through a BIOS user interface, through a BMC user interface, or through an operating system-based user interface.

After memory initialization is complete and the status table 164 has been populated, the memory buffer 162 receives memory access commands from the memory controller 150 and takes appropriate actions based on the status table 164. In this regard, when the memory buffer 162 receives any memory command besides a read (e.g. write, refresh, activate, pre-charge, etc), it directs the command to both the primary memory segment and also the mirrored memory segment associated with the primary segment. In this manner, the memory devices comprising the mirrored memory segments will be in the same state as the memory devices comprising the primary memory segments, and data will be mirrored between the primary and mirrored memory segments. For instance, when the memory buffer 162 receives a write command and associated data directed toward an address in rank 0, it writes the data to the address in rank 0 and also the corresponding address in rank 2.

The behavior of the memory buffer 162 is slightly different, however, upon the receipt of a read command from the memory controller 150. In the illustrated embodiment, the memory buffer 162 alternates reads between the primary memory segments and the mirrored memory segments, for each mirrored segment association that is Operational and Mirrored. The memory buffer 162 maintains a status bit for each mirrored segment association that indicates whether the Primary or Mirrored segment was Last Read. The memory buffer 162 will in general alternate reads between the associated segments except for specific circumstances to be described later. For example, upon a first read command to an address in rank 1, the memory buffer will retrieve the requested data from the addressed memory portion in rank 1, upon a second read command to an address in rank 1, the memory buffer will retrieve the requested data from the addressed memory portion in rank 3, upon a third read command to an address in rank 1, the memory buffer will retrieve the requested data from the addressed memory portion in rank 1, etc., in each case updating the Last Read flag accordingly.

This "ping-pong" behavior allows the system to detect and remedy correctable and uncorrectable data errors that accumulate in memory.

Memory controllers typically subject system memory to a background error checking procedure called patrol scrubbing. During a patrol scrub, a memory controller periodically performs reads to all memory locations to seek out and fix memory errors that have occurred before they become uncorrectable or unmanageable. The "ping-pong" behavior described herein allows a memory controller, without knowledge of the memory buffer mirroring, to patrol scrub both primary memory segments and mirrored memory segments, because, in the absence of memory buffer-directed alternating reads, a mirrored memory segment would never be patrol scrubbed as it is "hidden" from the memory controller. Although on any specific pass of the patrol scrub, each address is directed to only one of the Primary or Mirrored sets, multiple patrol scrub passes will eventually cover all addresses in both the Primary and Mirrored sets to an arbitrarily high probability over time. Normal patrol scrub rates may be increased to ensure that each address in both the Primary and Mirrored sets are scrubbed within a desired amount of time.

To facilitate the above described alternating read behavior, the memory buffer 162 maintains a list or 'scoreboard' 166 of recent memory reads to Operational, mirrored memory locations. In more detail, the scoreboard 166 is a First-In-First-Out (FIFO) list that contains, among other things, recently read addresses and an indication of which memory segment-primary or mirrored—that the memory buffer last accessed for each address. Entries associated with older reads are pushed out by entries associated with newer reads. An example of the scoreboard 166 is shown in Table 3 below:

TABLE 3

| Entry# | Set 1 Data | Set 1 Valid? | Set 2 Data | Set 2 Valid | Address | Address Valid? | Last Set Read | Locked? |
|---|---|---|---|---|---|---|---|---|
| 0 | S1 Data | 0/1 | S2 Data | 0/1 | 00000000 | 0/1 | S1/S2 | 0/1 |
| 1 | S1 Data | 0/1 | S2 Data | 0/1 | 00000000 | 0/1 | S1/S2 | 0/1 |
| ... | ... | ... | ... | ... | ... | ... | ... | ... |
| N | S1 Data | 0/1 | S2 Data | 0/1 | 00000000 | 0/1 | S1/S2 | 0/1 |

In the example Table 3, each row/entry corresponds to a recent memory read action by the memory buffer 162 and includes the unique address (Row+Column+Rank+ . . . ) transmitted by the memory controller 150 to initiate the read. The scoreboard 166 collects information about the last 'N' memory reads before replacing the oldest entries with the newest entries. Further, when the memory buffer 162 writes data to an address already associated with an entry in the scoreboard 166, the buffer removes that entry from the scoreboard. The total number of entries, 'N', in the scoreboard 166 depends on the maximum number of concurrent memory read commands that may be issued by memory controller (i.e. in-flight/pipelined reads). That is, the scoreboard is large enough to accommodate the maximum number of outstanding reads with unique addresses to all ranks behind the memory buffer 162, plus the maximum number of entries that may simultaneously be in the "locked" stated, discussed in further detail below. In one embodiment, 'N' may be about 8 to 16, but, in other embodiments, it may be greater or smaller.

For each memory read command, the memory buffer 162 caches the retrieved data in the scoreboard 166 simultaneously with transmitting it to the memory controller 150. If the address of the read command is not already located in a scoreboard entry, the memory buffer 162 issues the read to either the Primary or Mirrored set, depending on the alternate state of the Last Read flag for the mirrored segment association. However, if the address of the read command is already located in the scoreboard, the memory buffer 162 issues the read to either the Primary or Mirrored set, depending on the alternate state of the Last Read flag for that specific address as maintained by the scoreboard entry. Depending on which rank in a mirrored pair the memory buffer 162 read from in response to the last read command, the scoreboard may include data from the primary rank (set 1), the mirrored rank (set 2), or both. The scoreboard 166 will include data from both ranks in a mirrored pair if the memory buffer first reads from one of the ranks (thus creating an entry in the scoreboard) and subsequently reads from the other of the ranks when the entry corresponding to the first read is still in the scoreboard (i.e. it had not yet been pushed out by newer entries or an intervening write). When the memory buffer 162 adds a second set of data to an entry indicating that another read was made to the same address, the entry is moved to the top of the scoreboard as the newest entry.

Each entry in the scoreboard 166 includes an Address Valid field which indicates that the status row has a valid entry, and that the memory buffer 162 is caching memory read data associated with the memory address captured in the Address field. For each portion of read data cached in an entry, the scoreboard 166 includes a cell indicating whether the read data is valid—that is, whether the data contains is a cached copy from a recent memory read. The memory buffer 162 sets the 'Set 1 Valid?' field after a read to Set 1 and sets the 'Set 2 Valid?' field after a read to Set 2. The scoreboard 166 includes a 'Locked?' flag for each entry which, when set, indicates that valid data in Set 1 and valid data in Set 2 are not equal, and that the entire entry will be held in the current state for analysis by BIOS 156 error handling. The 'Address Valid?' field, 'Set 1 Valid?' field, and 'Set 2 Valid?' field are all cleared on a data write to a matching address criteria or after a system reset. The 'Locked?' flag is only cleared by BIOS 156 or after a system reset.

As mentioned above, the memory buffer 162 alternates reading between ranks in a mirrored pair for a given address. As an aspect of this, the scoreboard 166 keeps track of which rank in a mirrored pair the memory buffer last read from in the 'Last Set Read' field. Thus, when the memory buffer 162 receives a read command from the memory controller 150 for an address that is already associated with an entry in the scoreboard, the buffer will check the 'Last Set Read' field and read from the other rank in the mirrored pair. Finally, as shown in Table 3, each entry in the scoreboard 166 includes a 'Locked' field which indicates whether the associated entry has been locked and thus will not be removed during normal FIFO operation. The memory buffer 162 locks an entry if the data read from the primary rank (Set 1) does not match the data read from the mirrored rank (Set 2). An entry will remain locked until the BIOS 156 is alerted to the error via a system exception such as a System Management Interrupt (SMI) or a memory error notification and can inspect the locked entry. The BIOS 156 examines the contents of the entry including the data in Set 1, Set 2, and the 'Last Set Read' field to determine the origin of the error (i.e. which data set is corrupt), and thus what remedial action to take. For example, if the BIOS 156 determines that the data read from the primary rank includes an uncorrectable error, it may change the status of the rank in the status table 164 to 'failed,' thus instructing the memory buffer only to perform reads from the mirror rank. That is, it "fails over" to the mirror rank. The error detection and remedial actions of the BIOS 156 will be discussed in greater detail in association with Table 6.

It is understood that the above Table 3 is simply an example and the scoreboard 166 may contain additional and/or different information and may be configured differently in alternative embodiments. For example (and as shown below), depending on the granularity of the memory mirroring, the 'Last Set Read' field may refer to a rank, DIMM, DRAM, BANK, address, etc.

Figure 3:
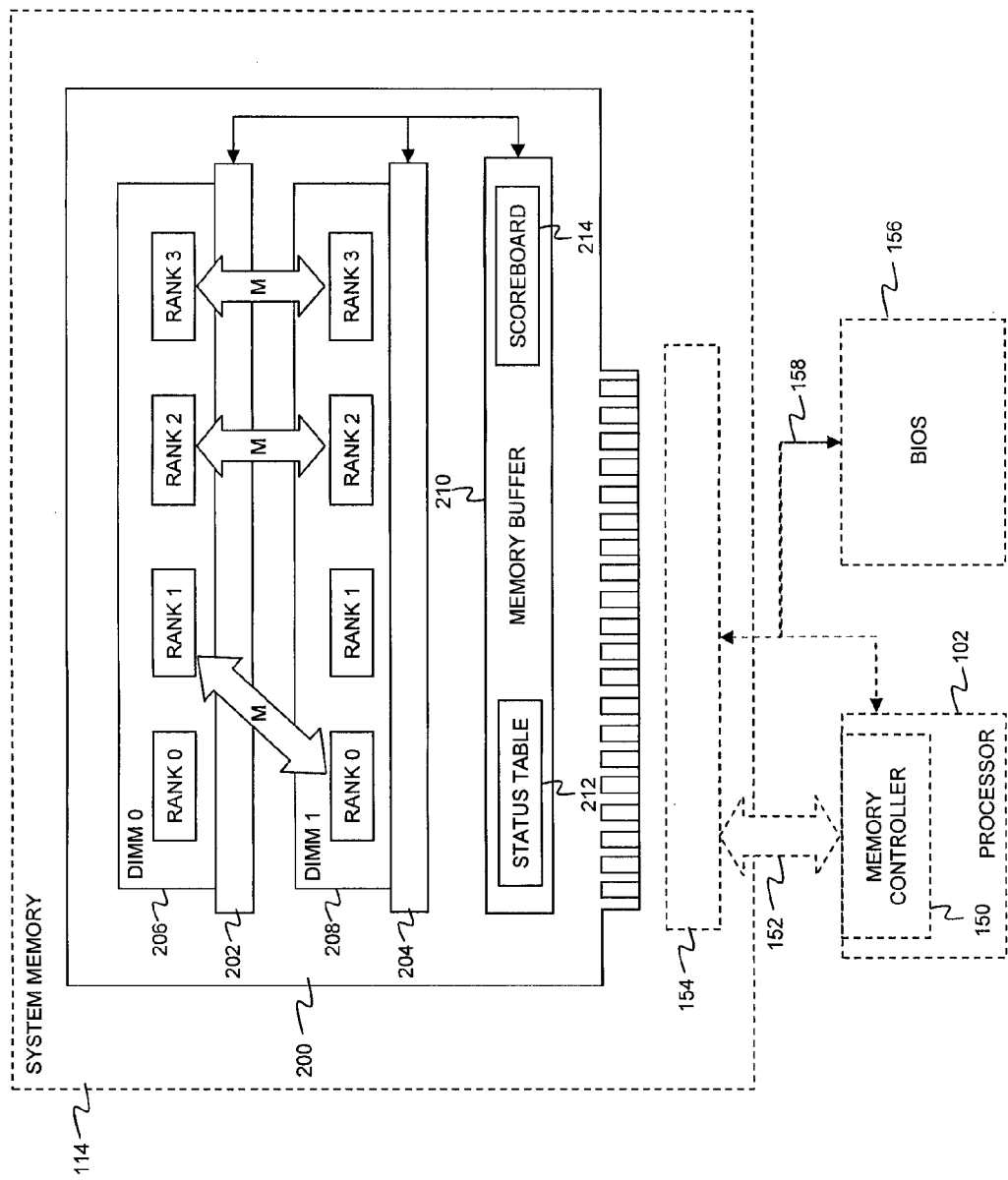
FIG. 3 is a functional block diagram of a portion of the IHS of FIG. 1 including the processor and system memory according to another embodiment of the present disclosure.

FIG. 3 is a functional block diagram of a portion of the IHS 100 of FIG. 1 including the processor 102 and system memory 114 according to another embodiment of the present disclosure. However, in the illustrated embodiment of FIG. 3, the system memory 114 includes a buffered memory riser card 200. An edge connector of riser card 200 mates with the DIMM socket 154. The riser card 200 includes DIMM sockets 202 and 204 into which SDRAM DIMMs 206 (DIMM 0) and 208 (DIMM 1) are respectively inserted. In the illustrated embodiment, the DIMM socket standard on the riser card matches the native DIMM socket standard in the IHS, which permits the IHS to utilize a greater number of DIMMS than it has native DIMM sockets, thus increasing IHS memory capacity. In other embodiments, however, the riser card 162 may include DIMM sockets that conform to a different standard such as the DDR3 DIMM standards, the DDR2 DIMM standards, or a future standard promulgated by JEDEC or another standard setting organization. Each DIMM 206 and 208 includes memory locations logically divided into four ranks. As shown in FIG. 3, ranks in DIMM 206 are mirrored against ranks in DIMM 208. The riser 200 additionally includes a memory buffer 210 which buffers data between the DIMMs 206 and 208 and the memory controller (i.e. in a Buffer-on-Riser configuration). The memory mirroring between the ranks is managed by the on-board buffer 210 and BIOS 156, and thus invisible to the memory controller 150. The memory buffer 210 includes a status table 212 and a scoreboard 214 that are similar to the status table 164 and scoreboard 166 discussed in association with FIG. 2. The scoreboard 214 is maintained by the memory buffer 210 in a manner similar to that discussed in association with FIG. 2. The BIOS 156 populates the status table 212 during memory initialization and the memory buffer 210 or BIOS 156 updates it during IHS 100 runtime. An example of the status table 212 is shown in Table 4 below:

TABLE 4

| DIMM# | Rank # | Mirrored DIMM# | Mirrored Rank # | Rank Status | Notes |
|---|---|---|---|---|---|
| 0 | 0 | — | — | Valid | Operational, not mirrored |
| 0 | 1 | 1 | 0 | Valid | Operational, mirrored |
| 0 | 2 | 1 | 2 | Failed | Memory errors, not used |
| 0 | 3 | 1 | 3 | Invalid | Uninitialized |
| 1 | 0 | 0 | 1 | Valid | Operational, mirrored |
| 1 | 1 | — | — | Valid | Operational, not mirrored |

TABLE 4-continued

| DIMM# | Rank # | Mirrored DIMM# | Mirrored Rank # | Rank Status | Notes |
|---|---|---|---|---|---|
| 1 | 2 | 0 | 2 | Valid | Operational, no longer mirrored |
| 1 | 3 | 0 | 3 | Valid | Operational, not mirrored |

The example Table 4 dictates the mirroring associations of the ranks in DIMMs 0 and 1. In the illustrated example of FIG. 3, rank 0 in DIMM 0 and rank 1 in DIMM 1 are not mirrored, and thus, in Table 3, these ranks are not associated with mirrored ranks. Also, Table 4 indicates that rank 3 in DIMM 0 is invalid. As mentioned above, a rank may be listed as 'invalid' in a buffer status table if it has not been initialized. Here, because rank 3 in DIMM 0 is uninitialized, its mirrored pair, rank 3 in DIMM 1 is operational but not mirrored. Again, it is understood that Table 4 is simply an example according to aspects of the present disclosure and is not limiting.

Figure 4:
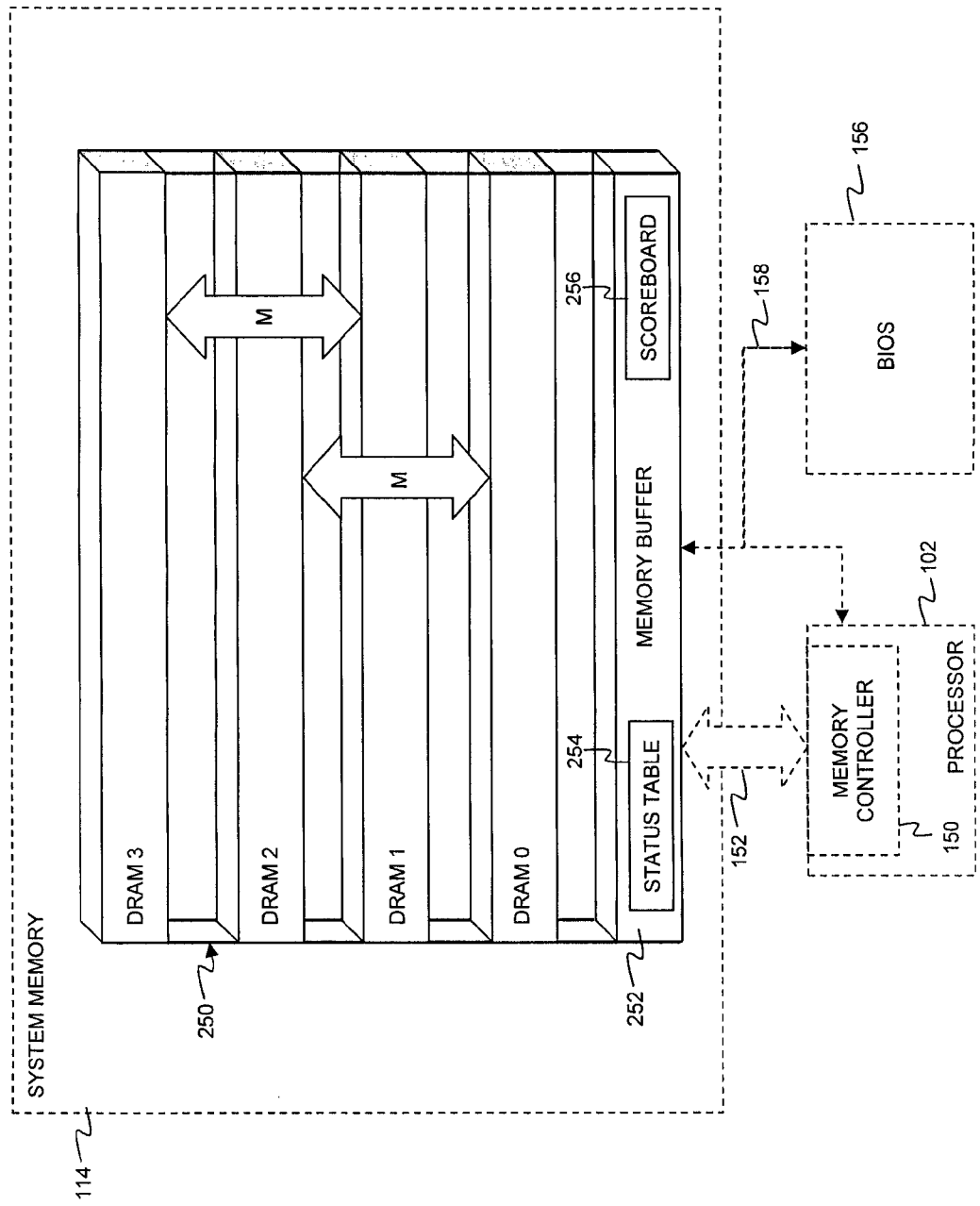
FIG. 4 is a functional block diagram of a portion of the IHS of FIG. 1 including the processor and system memory according to yet another embodiment of the present disclosure.

FIG. 4 is a functional block diagram of a portion of the IHS 100 of FIG. 1 including the processor 102 and system memory 114 according to yet another embodiment of the present disclosure. However, in the illustrated embodiment of FIG. 4, the system memory 114 includes a DIMM with a plurality of buffered Through-Silicon Via (TSV) DRAM assemblies 250 (only one of which is illustrated in FIG. 4) communicatively coupled to the memory controller 150 and the BIOS 156. Each TSV DRAM assembly 250 includes a plurality of vertically stacked DRAM chips: DRAM 0, DRAM 1, DRAM 2, and DRAM 3. Each TSV DRAM assembly 250 also includes a memory buffer 252 with a status table 254 and scoreboard 256 that are respectively similar to the status table 164 and scoreboard 166 discussed in association with FIG. 2. The scoreboard 256 is maintained by the memory buffer 254 in a manner similar to that discussed in association with FIG. 2. The BIOS 156 populates the status table 254 during memory initialization and the memory buffer 252 and BIOS 156 update it during IHS 100 runtime. As shown in FIG. 4, memory in TSV DRAM Assembly 250 is mirrored between the stacked DRAM chips. The status table 254 tracks the associations between the DRAM chips. An example of which is shown in Table 5 below:

TABLE 5

| DRAM# | Mirrored DRAM # | DRAM Status | Notes |
|---|---|---|---|
| 0 | 2 | Valid | Operational, mirrored |
| 1 | 3 | Valid | Operational, mirrored |
| 2 | 0 | Valid | Operational, mirrored |
| 3 | 1 | Valid | Operational, mirrored |

It is understood that Table 5 is just an example and the status table 254 in memory buffer 252 may reflect any number of memory mirroring configurations.

Figure 5:
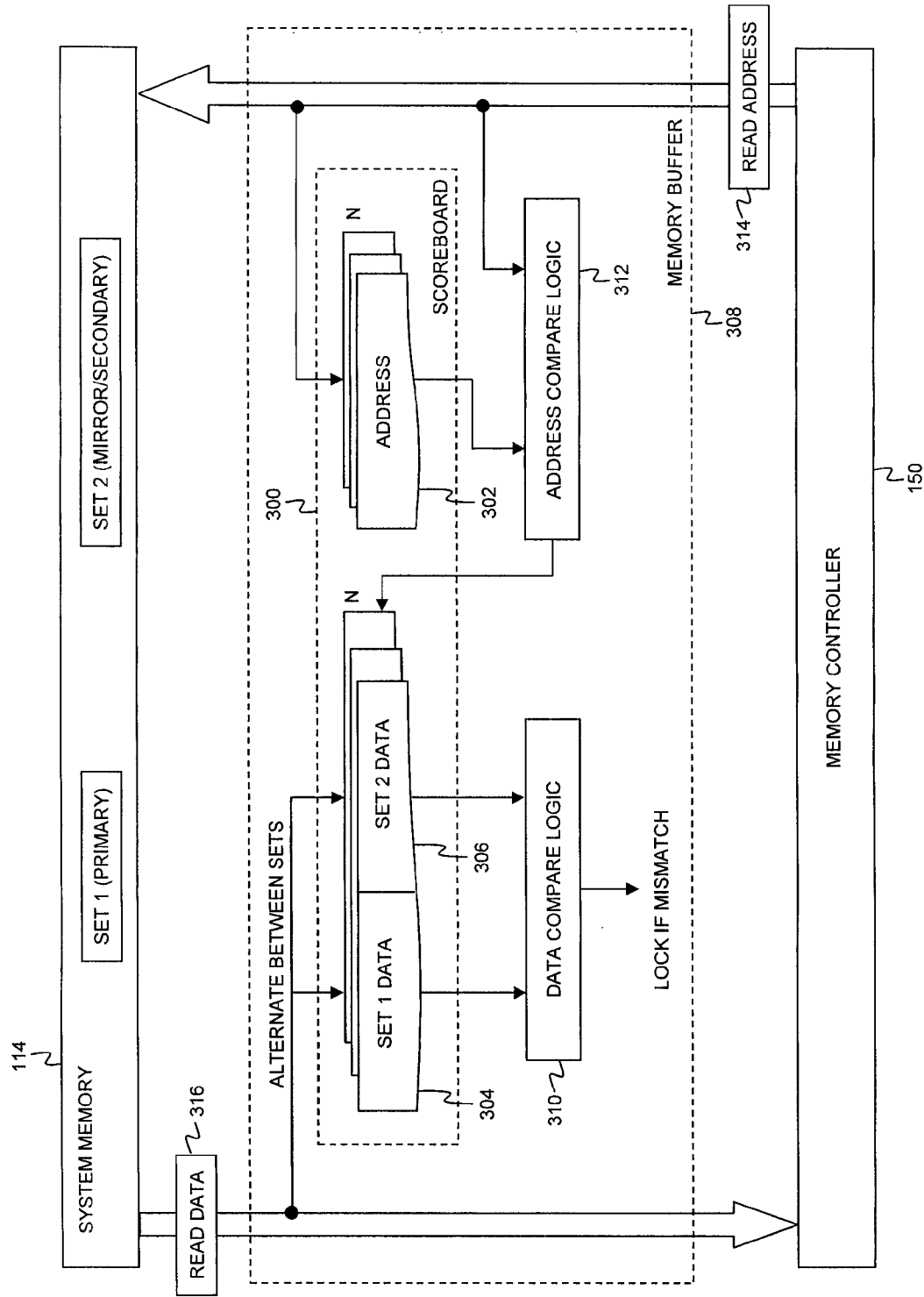
FIG. 5 is a functional block diagram showing the operation of a memory mirroring scoreboard in an IHS according to various aspects of the present disclosure.
Figure 6:
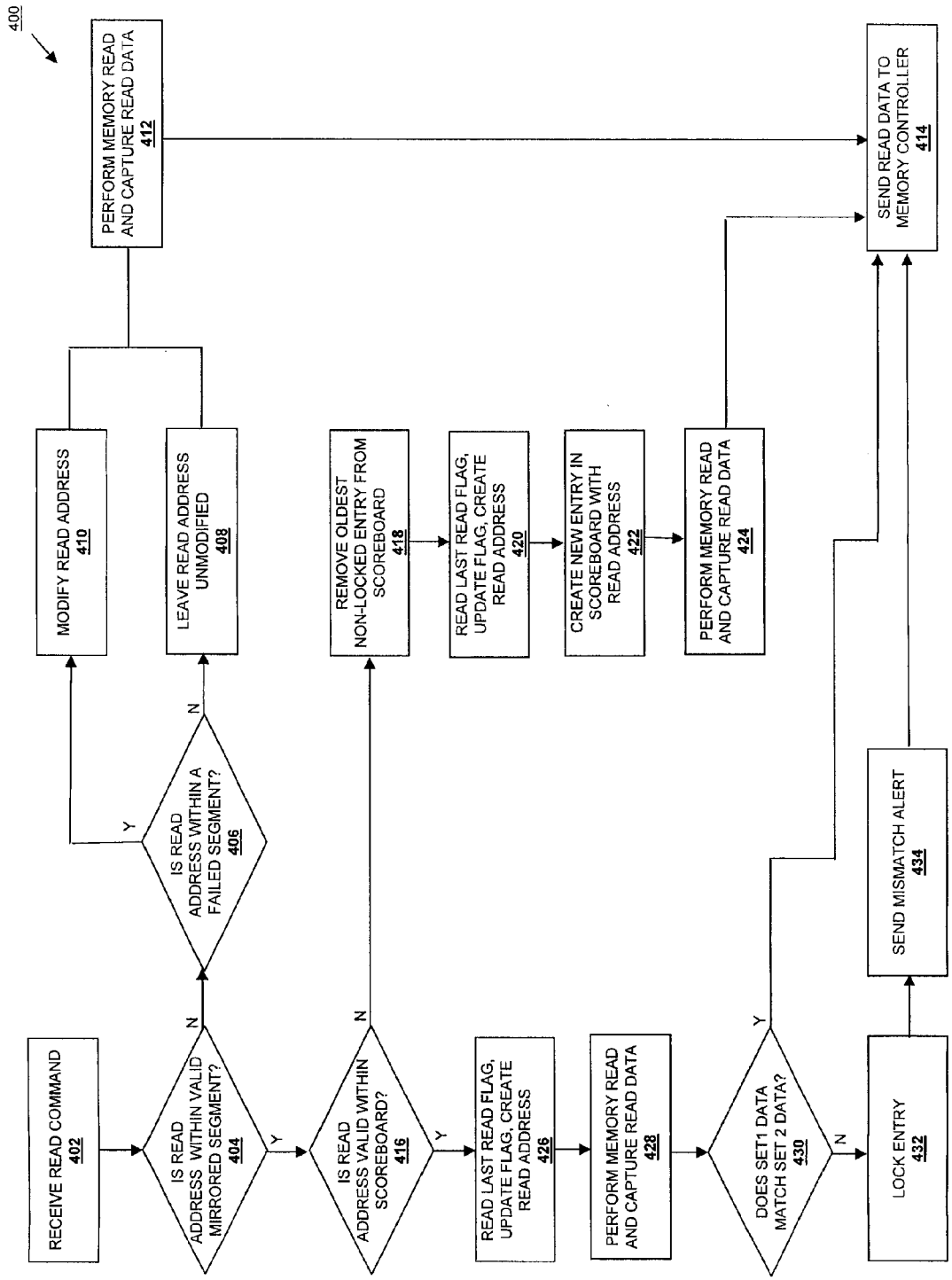
FIG. 6 is a flow chart illustrating a method of memory controller independent memory mirroring in response to a read command according to various aspects of the present disclosure.
Figure 7:
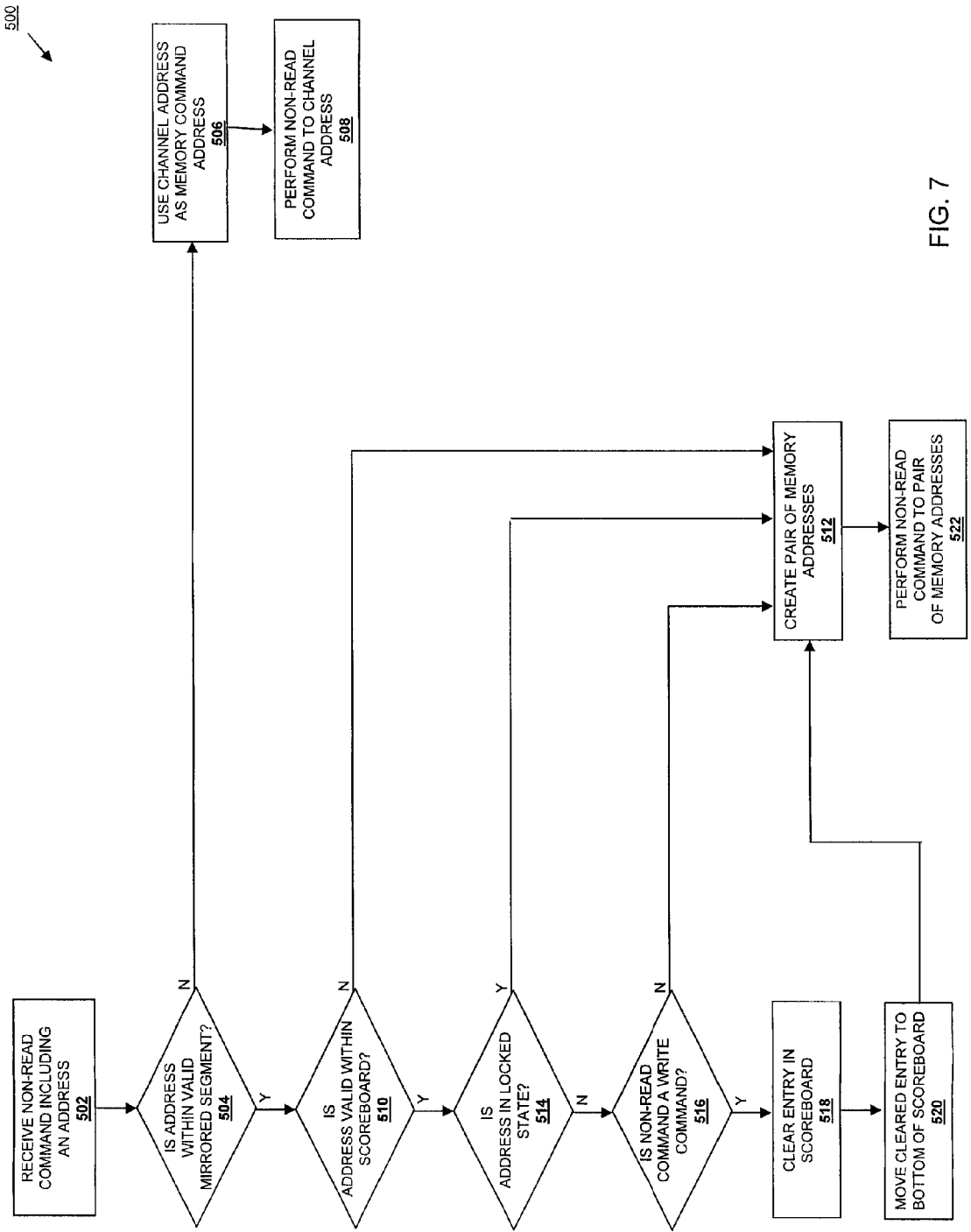
FIG. 7 is a flow chart illustrating a method of memory controller independent memory mirroring in response to a non-read command according to various aspects of the present disclosure.

Referring now to FIGS. 5, 6, and 7, FIG. 5 is a functional block diagram showing the operation of a memory buffer 308 to provide a memory mirroring scoreboard 300 according to various aspects of the present disclosure, while FIGS. 6 and 7 are flow charts illustrating a method 400 for memory controller independent memory mirroring in response to a read command, and a method 500 for memory independent memory mirroring in response to a non-read command. The methods 400 and 500 in FIGS. 6 and 7 will be described in association with the elements illustrated in FIG. 5.

In FIG. 5, the scoreboard 300 is a FIFO list similar to the scoreboards 166 and 214 described in association with FIGS. 2 and 3 and Table 3. Specifically, the scoreboard 300 includes an 'N' number of entries where each entry includes an address field 302, a data field 304 to hold data from Set 1 (i.e. the primary set) and a data field 306 to hold data from Set 2 (i.e. the 'mirror' or secondary set). Further, the scoreboard 300 is maintained by a memory buffer 308, which includes a data compare logic module 310 and an address compare logic module 312. FIG. 5 illustrates the operation of the memory buffer 308 to provide the scoreboard 300 during a read command operation initiated by memory controller 150. Specifically, as part of the read command, the memory controller 150 sends the system memory 114 a read address 314 and the system memory returns read data 316.

Prior to the operation discussed below, the memory buffer 308 receives memory mirroring configuration information from the BIOS memory initialization firmware during memory initialization. As mentioned above, the BIOS 156 populates a memory mirroring status table in the memory buffer 308 with information about the mirroring associations between memory segments behind the buffer. The initialization interface may be "in-band" over the DDR channel 152 or "out-of-band" using an industry standard management interface such as, for example, SMBus, and/or other industry standard or proprietary interfaces. For diagnostic, test, validation, and error handling purposes, the BIOS 156 may also include the ability to directly read or write the individual scoreboard 300 (166, 214, 256) and status table (164, 212, 254) elements that would normally be only updated by the memory buffer 308.

Referring to FIGS. 5 and 6, the method 400 for memory independent memory mirroring in response to a read command is illustrated. The method 400 begins at block 402 where a read command is received. In an embodiment, the memory buffer 308 receives a DDR read command that includes the read address 314. The method 400 then proceeds to decision block 404 where it is determined whether the read address is valid within a mirrored segment. In an embodiment, the memory buffer 308 determines whether the read address 314 is within a valid mirrored segment by checking whether the read address 314 is within a mirrored, operational, and valid memory segment by comparing the read address 314 to the ranges established and maintained in the status table. If at decision block 404 it is determined that the read address 314 is not within a valid mirrored segment, the method 400 continues to decision block 406 where it is determined whether the read address is within a failed segment. In an embodiment, the memory buffer 308 determines if the read address 314 is within a failed segment by comparing the read address 314 to the ranges established and maintained in the status table. If at decision block 406, the memory buffer 308 determines that the read address 314 is not within a failed segment, the method 400 continues to block 408 where the read address is left unmodified. For example, the memory buffer 308 may use the unmodified DDR channel address as the memory read address. If at decision block 406, the memory buffer 308 determines that the read address 314 is within a failed segment, the method 400 continues to block 410 where the read address is modified. For example, the memory buffer 308 may compute a substitute address, which may be a different chip select/rank, address line, or other modification per the status table, as illustrated in tables 1, 2, and 4 above. After establishing the read address (e.g., the DRAM read address) in blocks 408 or 410 of the method 400, the method 400 proceeds to block 412 where a memory read is performed and read data is captured. In an embodiment, the memory buffer 308 may issue a memory read command to the DRAMs and capture the read data in a Read Data buffer 316. In this embodiment, there is only a valid single source for the read data and thus there is no need to update the Scoreboard 300, so the method 400 proceeds to block 414 where the read data is sent to the memory controller 150.

Referring back to decision block 404, if it is determined that the read address 314 is within a valid mirrored segment, the method 400 continues to decision block 416 where it is determined whether the read address is valid within the scoreboard. In an embodiment, the memory buffer 308 determines whether the read address 314 is valid within the scoreboard 300 in the same manner as discussed above. If at decision block 416, the memory buffer 308 determines that the read address 314 is not valid within the scoreboard 300, the method 400 proceeds to block 418 where the oldest non-locked entry is removed from the scoreboard. In an embodiment, the memory buffer 308 pushes the oldest non-locked entry out of the scoreboard 300 (e.g., according to FIFO operation.) The method 400 then proceeds to block 420 where the 'Last Read' flag is read, updated, and a read address is created. In an embodiment, the memory buffer 308 reads the state of the 'Last Read' flag for the mirrored segment, updates the flag to the alternate set, and creates a memory read address. In an embodiment, the memory read address includes the specific rank, bank, DRAM, address line manipulation discussed above that allows the primary or mirrored set to be selected. The method 400 then proceeds to block 422 where a new entry is created in the scoreboard with the read address that was created in block 420. In an embodiment, the memory buffer 308 creates a "First In" entry in the scoreboard 300 with the memory read address created in block 420 and allocates that entry to either Set1 or Set2 based on the mirrored segment flag, as discussed above. The method 400 then proceeds to block 424 where a memory read is performed and read data is captured. In an embodiment, the memory buffer 308 performs a memory read and captures the read data in Set1 or Set2 as applicable, and sets the applicable flags in the scorecard 300 (e.g., the 'Address Valid?' flag, 'Set 1 Data' flag, 'Set 1 Valid?' flag, 'Set 2 Data' flag, 'Set 2 Valid?' flag, etc). The method 400 then proceeds to block 414 where the read data is sent to the memory controller 150.

Referring back to decision block 416, if the memory buffer 308 determines that the read address 314 is valid within the scoreboard 300, the method 400 proceeds to block 426 where the 'Last Read' flag is read, updated, and a read address is created. In an embodiment, the memory buffer 308 reads the state of the 'Last Read' flag within the scoreboard 300, updates the flag to the alternate set, and creates a memory read address. The method 400 then proceeds to block 428 where a memory read is performed and read data is captured. In an embodiment, the memory buffer 308 performs a memory read and captures the read data in Set1 or Set2 as applicable, and sets the applicable flags in the scorecard 300 (e.g., the 'Set 1 Valid?' flag, 'Set 2 Valid?' flag, etc). The method 400 then proceeds to decision block 430 where the memory buffer 308 determines whether Set1 data matches Set2 data. In an embodiment, the memory buffer 308 may compare the Set1 data to the Set2 data to determine whether any corresponding bits miscompare, and/or perform a variety of other mismatch operations known in the art. If at decision block 430 the memory buffer 308 determines that Set1 data matches Set2 data, the method 400 proceeds to block 414 where the read data is sent to the memory controller 150. If at decision block 430 the memory buffer 308 determines that Set1 data does not match Set2 data, the method 400 proceeds to block 432 where the entry is locked. In an embodiment, the memory buffer 308 sets the lock flag for the scoreboard entry that corresponds to the unmatched Set1 and Set2 data to 'locked'. The method 400 then proceeds to block 434 where a mismatch alert is sent. In an embodiment, the memory buffer 308 sends an alert to the system management and/or the BIOS that a mismatch has occurred. The method 400 then proceeds to block 414 where the read data is sent to the memory controller 150. In an embodiment, at block 434, there may be no wait for the BIOS to inspect or handle the read data, and thus that read data may be sent to the memory controller 150 even if a mismatch is detected.

Referring to FIGS. 5 and 7, the method 500 for memory independent memory mirroring in response to a non-read command is illustrated. The method 500 begins at block 502 where a non-read command that includes an address is received. In an embodiment, the memory buffer 308 receives a DDR non-read command that may include a mode register set command, a refresh command, a self-refresh entry/exit command, a pre-charge command, a bank activate command, a write command, a no-op command, a de-select command, a power down entry/exit command, a ZQ calibration command, and/or a variety of other non-read commands known in the art. The method 500 then proceeds to block 504 where it is determined whether the address is within a valid mirrored segment. In an embodiment, the memory buffer 308 determines whether the address received along with the non-read command in block 502 of the method 500 is within a valid mirrored segment in the scorecard 300. If at decision block 504 the memory buffer 308 determines that the address is not within a valid mirrored segment, the method 500 proceeds to block 506 where a channel address is used as a memory command address. In an embodiment, the memory buffer 308 uses a DDR channel address as the memory command address. Note that in this illustrative example the memory controller 150 provides the DDR channel address directly, but in alternate embodiments intermediate devices may alter the memory controller address to establish the DDR channel address. The method 500 then proceeds to block 508 where the non-read command is performed to the channel address. In an embodiment, the memory buffer 308 uses the single DDR channel address to perform the non-read command received in block of the method 500.

Returning to decision block 504, if the memory buffer 308 determines that the address is within a valid mirrored segment, the method 500 proceeds to decision block 510 where it is determined whether the address is valid within the scoreboard. In an embodiment, the memory buffer 308 determines whether the address received along with the non-read command in block 502 of the method 500 is valid in the scoreboard 300, discussed above. If at decision block 510 the memory buffer 308 determines that the address is not valid within the scoreboard, the method 500 proceeds to block 512 where a pair of memory addresses are created. In an embodiment, the memory buffer 308 creates a pair of memory addresses from the DDR channel address and the valid mirrored segment tables, discussed above. For example, when two ranks are mirrored, the memory buffer may assert multiple chip select signals as appropriate.

Returning to decision block 510, if the memory buffer 308 determines that the address is valid within the scorecard, the method 500 proceeds to decision block 514 where it is determined whether the address is in a locked state. In an embodiment, the memory buffer 308 determines whether the address received along with the non-read command in block 502 of the method 500 is in a locked state using the scorecard 300, discussed above. If at decision block 514 the memory buffer 308 determines that the address is in a locked state, the method 500 proceeds to block 512 where a pair of memory addresses are created, as discussed above.

Returning to decision block 514, if the memory buffer 308 determines that the address is not in a locked state, the method 500 proceeds to decision block 516 where it is determined whether the non-read command is a write command. In an embodiment, the memory buffer 308 determines whether the DDR non-read command received at block 502 of the method 500 is a write command. If at decision block 516 the memory buffer 308 determines that the non-read command is not a write command, the method 500 proceeds to block 512 where a pair of memory addresses are created, as discussed above.

Returning to decision block 516, if the memory buffer 308 determines that the non-read command is a write command, the method 500 proceeds to block 518 where an entry is cleared in the scoreboard. In an embodiment, the memory buffer 308 clears an entry in the scoreboard 300 including the "Address Valid' flag, the 'Set 1 Valid' flag, and the 'Set 2 Valid' flag. The method 500 then proceeds to block 520 where the cleared entry is moved to the bottom of the scorecard 300, In an embodiment, the memory buffer 308 moves entry cleared in block 518 of the method 500 to the bottom of the scorecard 300 according to FIFO operation. The method 500 proceeds to block 512 where a pair of memory addresses are created, as discussed above.

Upon creating the pair of memory addresses in block 512 of the method 500, the method 500 proceeds to block 522 where the non-read command is performed to the pair of memory addresses. In an embodiment, the memory buffer 308 performs the non-read memory command to the pair of memory addresses created in block 512 of the method 500 (e.g., once per each mirrored segment.)

It is understood that the methods 400 and 500 illustrated in the flow charts of FIGS. 6 and 7 may, in alternative embodiments, be performed in a different order and may include different and/or additional blocks in some embodiments. For example, after the memory buffer 308 sends the read data 316 to the memory controller in block 414, the memory controller 150 may inspect the read data for errors. If the memory controller 150 detects that the read data 316 includes a correctable error (CECC), it will signal a system exception such as a System Management Interrupt (SMI) or a memory error notification. The BIOS 156 will detect the SMI and may issue back to back reads to the same read address 314. And due to the above mentioned ping-pong behavior, the back to back reads will populate the data fields 304 and 306 in a single entry with different data (corrupted and not corrupted). The difference in data will cause the buffer 308 to lock the entry, thus giving the BIOS 150 an opportunity to inspect the entry and determine the cause of the error. If, however, the controller 150 receives data with a UECC after block 420, it may automatically retry the data read. When it does, the memory buffer 308 will "ping-pong" and read from the opposite memory segment in the mirrored pair and hopefully return error-free data to the memory controller.

As described in association with FIG. 6, after a scoreboard entry is locked by the memory buffer, the BIOS 156 will inspect the contents of the locked entry to determine the type and cause of the error. It may also take remedial actions based upon the type and cause of the error. In its evaluation, the BIOS considers at least (1) whether the SMI indicated that the error was correctable or uncorrectable, (2) whether the two sets of data in the locked entry are the same, (3) which memory segment—Set 1 or Set 2—was last read, and (4) whether any software processing in the IHS has been halted because of a lack of access to data (i.e. the software has crashed). Based on this information, the BIOS 156 may determine the type and severity of the error, and also take some corrective action. An example of a BIOS error processing decision tree is shown in Table 6, below:

TABLE 6

| SMI Type | Is Read Data same in both sets? | Last Set Read | Has System Crashed? | Error Analysis | BIOS Remedial Actions |
|---|---|---|---|---|---|
| UECC | No | Set 1 | No | Set 2 UECC | Log error against Set 2; fail Set 2; fail-over to Set 1 only |
| UECC | No | Set 2 | No | Set 1 UECC | Log error against Set 1; fail Set 1; fail-over to Set 2 only |
| UECC | No | Set 1 or 2 | Yes | Set 1 & Set 2 UECC | Log error against host channel; clear address, do not fail-over; crash |
| CECC | No | Set 1 | No | Set 2 CECC | Log error against Set 2; if CECC threshold exceeded, fail set 2 & fail-over to Set 1 only |
| CECC | No | Set 2 | No | Set 1 CECC | Log error against Set 1; if CECC threshold exceeded, fail set 1 & fail-over to Set 2 only |
| UECC or CECC | Yes | Set 1 or 2 | No | Read channel transient error | Log error against host channel; clear address, do not fail-over |
| UECC | Yes | Set 1 or 2 | Yes | Write channel error | Log error against host channel; clear address, do not fail-over; crash |

As an example of the BIOS error processing, if the BIOS receives an SMI indicative of an uncorrectable error, the data in Set 1 and Set 2 of a locked entry is different, the last set read was Set 1, and the system has not crashed, the BIOS may determine that the data in Set 2 has an uncorrectable error. The fact that the IHS did not crash in this scenario implies that when the memory controller received the data from the mirror rank (Set 2) and detected an uncorrectable error, it signaled an SMI and automatically retried the read. And when the memory buffer received a second read command for the same address, it ping-ponged and read from the primary memory segment (Set 1), which produced data without an error, thus allowing the system to continue to operation without crashing. After the determination that the mirror memory segment produced the error, the BIOS logs an error and changes the status of the mirror memory segment to failed in the status table in the memory buffer, thus directing the buffer to stop reading from the mirror memory segment (i.e. fail-over to the primary memory segment).

Further, as shown in Table 6, the BIOS is not only able to determine which memory segment in a mirrored pair caused the error, but it is also able to distinguish between DRAM cell errors and channel errors. A system in which memory mirroring is controlled at the memory controller level may not be able to make such a distinction. Memory buffer-based mirroring thus reduces hardware service costs due to enhanced hardware error isolation.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method of memory controller-independent memory mirroring in an information handling system (IHS), comprising:
providing a mirroring association between a first memory segment and a second memory segment that are located in a system memory and that are coupled to a memory buffer, wherein the mirroring association is independent of a memory controller that is associated with the system memory and the second memory segment is unknown to the memory controller;
receiving, by the memory buffer from the memory controller, write data that is directed to a first memory location in the first memory segment;
writing, independent of the memory controller with the memory buffer, the write data to both the first memory segment and the second memory segment according to the mirroring association such that the first memory segment includes primary write data and the second memory segment includes mirrored write data that is a copy of the primary write data;
receiving, by the memory buffer from the memory controller, a plurality of read commands directed to the first memory location in the first memory segment, and, in response:
retrieving read data by reading the write data from an alternating one of the first memory segment and the second memory segment in response to the plurality of read commands; and
storing the read data in the memory buffer such that the memory buffer includes both first read data that is the primary write data that was read from the first memory segment in response to the plurality of read commands and second read data that is the mirrored write data that was read from the second memory segment in response to the plurality of read commands; and
performing, by the memory controller without knowledge of the mirroring association between the first memory segment and the second memory segment, a patrol scrubbing process using the first read data and the second read data in the memory buffer such that each of a plurality of addresses in both the first memory segment and the second memory segment are subject to the patrol scrubbing process over the plurality of read commands, wherein a patrol scrub rate is set in the memory controller such that each of the plurality of addresses in both the first memory segment and the second memory segment are subject to the patrol scrubbing process over the plurality of read commands within a predetermined amount of time.

2. The method of claim 1, further comprising:
utilizing the first read data and the second read data in the memory buffer to determine the cause of a system exception associated with one of the plurality of read commands.

3. The method of claim 2, further comprising:
storing, in the memory buffer, information identifying which of the first memory segment and the second memory segment was read from last and alternating between the first memory segment and the second memory segment based on the information; and
utilizing the information to determine the cause of the system exception.

4. The method of claim 2, wherein the utilizing the first read data and the second read data includes determining whether one of the first read data and the second read data includes a miscompare.

5. The method of claim 2, wherein the utilizing the first read data and second read data includes determining whether the system exception was due to one of a channel transmission error and a write error.

6. The method of claim 1, further including:
comparing, with the memory buffer, the first read data and the second read data; and
in response to determining that the first read data and the second read data do not match, storing the first read data and the second read data in the memory buffer until the first read data and the second read data are used to determine the cause of a system exception associated with one of the plurality of read commands.

7. The method of claim 1, further comprising:
receiving, by the memory buffer, memory mirroring configuration information that is used to provide the mirroring association.

8. A method of memory controller-independent memory mirroring in an information handling system (IHS), comprising:
receiving, by a memory buffer, memory mirroring configuration information from a management module;
providing, by the memory buffer, a memory mirroring association between a primary memory segment and a secondary memory segment using the memory mirroring configuration information, wherein the memory mirroring association is independent of a memory controller and the second memory segment is unknown to the memory controller;
receiving, by the memory buffer, write commands and write data from the memory controller, wherein the write commands are directed toward addresses in the primary memory segment;
writing the write data to both addresses in the primary memory segment and to addresses in the secondary memory segment independent of the memory controller using the memory buffer such that the primary memory segment includes primary write data at the addresses in the primary memory segment and the secondary memory segment includes mirrored write data at the addresses in the secondary memory segment that is a copy of the primary write data;
receiving, by the memory buffer, a first read command from the memory controller, the first read command being directed toward the addresses in the primary memory segment;
selecting, by the memory buffer in response to the first read command, one of the primary memory segment and the secondary memory segment from which to read the write data according to the first read command, wherein the selecting is independent of the memory controller;
retrieving, by the memory buffer based on the selecting in response to the first read command, first read data that is one of (1) the primary write data from the addresses in the primary memory segment or (2) the secondary write data from the addresses in the secondary memory segment;
caching the first read data in the memory buffer and storing tracking information identifying the selected one of the primary memory segment and the secondary memory segment;
receiving, by the memory buffer, a plurality of subsequent read commands from the memory controller, the plurality of subsequent read commands being directed toward the addresses in the primary memory segment;
selecting, by the memory buffer in response to the plurality of subsequent read commands and using the stored tracking information, the one of the primary memory segment and the secondary memory segment that was not selected according to a previous read command;
retrieving, by the memory buffer based on the selecting in response to the second read command, either the first read data that is the primary write data from the addresses in the primary memory segment, or second read data that is the secondary write data from the addresses in the secondary memory segment that were not selected according to the previous read command;
comparing, by the memory buffer, the first read data and the second read data;
in response to determining that the first read data and the second read data do not match, holding the first read data and the second read data in the memory buffer until the management module can analyze the first read data and the second read data; and
performing, by the memory controller without knowledge of the mirroring association between the first memory segment and the second memory segment, a patrol scrubbing process using the first read data and the second read data in the memory buffer such that each of the addresses in both the first memory segment and the second memory segment are subject to the patrol scrubbing process over the first read command and the plurality of subsequent read commands, wherein a patrol scrub rate is set in the memory controller such that each of the addresses in both the first memory segment and the second memory segment are subject to the patrol scrubbing process over the plurality of read commands within a predetermined amount of time.

9. The method of claim 8, further comprising:
maintaining, in the memory buffer, a list of addresses in the primary memory segment to which read commands from the memory controller have been directed, wherein the maintaining includes storing tracking information identifying which of the first memory segment and the second memory segment was read from last for each address in the list of addresses.

10. The method of claim 9, wherein the list of addresses is a first-in-first-out list containing, at any given time, at least a number of addresses equal to the total number of outstanding read commands issued by the memory controller at the given time.

11. The method of claim 8, further comprising:
receiving a subsequent write command from the memory controller, the subsequent write command being directed toward the addresses in the primary memory segment; and
in response to receiving the subsequent write command, deleting the first read data and the second read data and the tracking information from the memory buffer.

12. The method of claim 8, wherein the primary memory segment and the secondary memory segment are each one of a rank, a bank, a DRAM chip, a DIMM, and an address range of memory locations.

13. An information handling system (IHS), comprising:
a system memory having a plurality of memory segments;
a memory controller that is coupled to the system memory and that is configured to store data in and retrieve data from the plurality of memory segments;
a memory buffer coupled between the memory controller and the plurality of memory segments, wherein the memory buffer is configured to maintain a mirroring association between a first memory segment and a second memory segment in the plurality of memory segments, wherein the mirroring association is independent of the memory controller and the second memory segment is unknown to the memory controller; and a management module coupled to the system memory, the memory buffer, and the memory controller, wherein the management module is configured to transmit mirroring association configuration information to the memory buffer;

wherein the memory buffer is further configured to:

receive write data from the memory controller that is directed to memory locations in the first memory segment;

write the write data to both the memory locations in the first memory segment and to memory locations in the second memory segment according to the mirroring association such that the first memory segment includes primary write data and the second memory segment includes mirrored write data that is a copy of the primary write data;

receive a plurality of read commands directed to the memory locations in the first memory segment from the memory controller, and, in response to the plurality of read commands:

retrieve read data by reading the write data from an alternating one of the first memory segment and the second memory segment in response to the plurality of read commands; and store the read data in the memory buffer such that the memory buffer includes both first read data that is the primary write data that was read from the first memory segment and second read data that is the mirrored write data that was read from the second memory segment; and wherein the memory controller is configured, without knowledge of the mirroring association between the first memory segment and the second memory segment, to perform a patrol scrubbing process using the first read data and the second read data in the memory buffer such that each of a plurality of addresses in both the first memory segment and the second memory segment are subject to the patrol scrubbing process over the plurality of read commands, and wherein a patrol scrub rate is set in the memory controller such that each of the addresses in both the first memory segment and the second memory segment are subject to the patrol scrubbing process over the plurality of read commands within a predetermined amount of time.

14. The method of claim 13, wherein the management module is further configured to utilize the first read data and second read data in the buffer to determine the cause of a system exception associated with one of the plurality of read commands.

15. The method of claim 14, wherein the memory buffer is further configured to store information identifying which of the first memory segment and the second memory segment was read from last and alternate between the first memory segment and the second memory segment based on the information, and wherein the management module is further configured to utilize the information in the buffer to determine the cause of the system exception.

16. The method of claim 13, wherein the memory buffer is further configured to compare the first read data and the second read data and, if the first read data and the second read data do not match, hold the first read data and the second read data in the memory buffer until the management module can utilize the first read data and the second read data to determine the cause of a system exception associated with one of the plurality of read commands.

17. The method of claim 16, wherein the management module is further configured to determine whether one of the first read data and the second read data includes an error.

* * * * *